United States Patent Office 3,780,182
Patented Dec. 18, 1973

3,780,182
METHOD FOR IMPARTING CHEESE-LIKE FLAVOR TO PROTEINACEOUS MATERIALS
John D. Johnson, Evanston, and Dean L. Southworth, Glenview, Ill., assignors to Kraftco Corporation, New York, N.Y.
No Drawing. Filed Jan. 18, 1971, Ser. No. 107,530
Int. Cl. A23c 19/12; A23l 1/26
U.S. Cl. 426—33                                          11 Claims

ABSTRACT OF THE DISCLOSURE

Method for imparting an enhanced cheese-like flavor to proteinaceous materials. A cheese protein source and a fat source are mixed together to provide a substrate. The fat source is a triglyceride fat having at least about 3 percent by weight of the fat of $C_{10}$ or lower saturated fatty acid moieties. The substrate is then subjected to elevated temperature conditions and is thereafter inoculated with an esterase. The inoculated substrate is fermented to split off and free at least part of the $C_{10}$ and lower fatty acid moieties. The fermented substrate is then combined with a proteinaceous material and is dried to provide a powdered product with an enhanced cheese-like flavor.

---

The present invention relates generally to a method for producing a powdered flavoring material with an enhanced cheese-like flavor. More particularly, the present invention relates to a method for imparting an enhanced cheese-like flavor to proteinaceous materials, such as whey.

It is known to produce powders having cheese flavor by providing a fluid mixture of aged cheeses, such as Cheddar and Swiss cheese, and thereafter spray drying the fluid mixture to provide a powder. It is also known to provide a fluid mixture of aged cheeses and dairy by-products, such as whey and buttermilk, and to thereafter dry the mixture to provide powdered materials with cheese-like flavor. However, known cheese flavored powdered materials are not always desirable in that the level of cheese-like flavor is not always sufficiently high for some applications. It would be desirable to provide a method for producing powdered materials with enhanced cheese-like flavor. It would also be desirable to provide a method for imparting cheese-like flavors to proteinaceous materials, such as whey, treated whey, buttermilk solids, skim milk solids, caseinates and vegetable proteins.

Accordingly, it is an object of the present invention to provide a method for the manufacture of a powdered material with an enhanced cheese-like flavor. It is another object of the present invention to provide a method for imparting an enhanced cheese-like flavor to proteinaceous materials. It is a further object of the present invention to provide a method for imparting an enhanced cheese-like flavor to whey and buttermilk solids. It is a still further object of the invention to provide a whey product with an enhanced cheese-like flavor and a method for manufacture thereof.

These and other objects of the present invention will become more apparent from the following detailed disclosure.

In general, the method of the present invention is directed to providing a proteinaceous material with an enhanced cheese-like flavor. In the method, a cheese protein source and a fat source are mixed together to provide a substrate. The fat source is a triglyceride fat having at least about 3 percent by weight of the fat of $C_{10}$ or lower saturated fatty acid moieties. The substrate is then subjected to predetermined, elevated temperature conditions. The temperature conditions are sufficient to substantially inactivate lipolytic enzymes present in the substrate. The substrate is then inoculated with a particular lipolytic enzyme. The inoculated substrate is then incubated and fermented for a period of time sufficient to split at least part of the $C_{10}$ and lower fatty acid moieties from the triglyceride fat source. The substrate is then dried to provide a product with a highly developed, cheese-like flavor. The dried product is then combined with a proteinaceous material to provide a product with an enhanced cheese-like flavor.

More particularly, the cheese protein source of the invention is selected from any natural (ripened or unripened) cheese produced from whole partially defatted or defatted milk. The cheese protein source thus includes casein and milk fat. The cheese protein source may be provided from any natural ripened cheese, such as American type cheese (such as Cheddar cheese and Colby cheese), Cream cheese, Neufchatel cheese, cottage cheese, Parmesan cheese, Pasta Filata cheese (such as Mozarella and Provelone), Swiss cheese, brick cheese, Muenster, Gouda and mixtures thereof. If the cheese protein source is selected from cheese that is normally ripened, the cheese need not be fully ripened and may be green curd which has not been subjected to any substantial ripening. The selection of a particular cheese source will influence the flavor of the finished product, but is not critical with respect to operation of the method of the invention. Particularly preferred cheese sources, from a standpoint of flavor, are Cheddar cheese, Colby cheese, Swiss cheese and Parmesan cheese. Process cheese, which has been prepared from natural cheeses, may also be used as the cheese source of the invention. The cheese protein source is generally used at a level of from about 40 percent to about 80 percent by weight of the mixture of the cheese protein source and the fat source in the substrate. Weight measurements are on the basis of the cheese having the amount of moisture usually associated with the cheese.

The fat source is selected from triglyceride fats which have at least about 3 percent by weight of the fatty acid moieties of the fat source present as $C_{10}$ or lower fatty acids. Suitable fat sources include, but are not limited to, butterfat, coconut oil, palm kernel oil and babassu oil. Butterfat may be supplied from any convenient source, such as butter or cream. Particularly preferred fat sources are those which have at least about 5 percent of the fatty acid moieties present as $C_8$ or lower fatty acids. Particularly preferred fat sources are butterfat, coconut oil, babassu oil and mixtures thereof. The fat source is generally present at a level of from about 20 percent to about 60 percent by weight of the mixture of the cheese protein source and the fat source.

Prior to mixing the cheese protein source and the fat source to prepare the substrate of the invention, it is preferred to comminute the cheese protein source. If the fat source is generally solid at the temperature at which the mixing is initially effected, it is preferred to also comminute the fat source. The comminuted cheese protein source and the fat source are then combined in a cooker equipped with agitating means. The cheese protein source and fat source are then blended and heated to a predetermined temperature sufficient to fluidize the mixture, and substantially inactivate lipolytic enzymes present in the cheese protein source. In this connection, the temperature to which the cheese protein source and fat source are heated may generally be from about 150° F. to about 235° F. for a hold time of from about 1 hour to substantially instantaneous, the longer hold time being associated with the lower temperature. Preferred heating conditions are at a temperature of from about 160° F. to about 180° F. for a hold time of from about 20 minutes to about 5 minutes. The heating of the cheese protein source and the fat source effects a substantial pasteurization of the cheese protein source and in this connection the heating further substantially inactivates lipolytic enzymes present in the cheese protein source. The substantial inactivation of lipolytic enzymes naturally present in the cheese protein source is an important step in the method of the present invention. The inactivation of lipolytic enzymes provides a substrate which is substantially neutral with respect to lipolytic enzyme activity.

After the cheese protein source and the fat source have been heated, water is added to the mixture so as to cool the mixture and provide a fluid substrate. The water may be at a temperature of from about 40° F. to about 110° F. and is added to the cheese protein source and fat source mixture at a level of from about 20 percent to about 80 percent by weight of the mixture. It is desirable that the mixture be cooled by the addition of water to a temperature of from about 90° F. to about 120° F.

Thereafter, a lipolytic enzyme is added to the substrate. In this connection, the lipolytic enzyme used in the practice of the present invention is an esterase. As used herein, esterases refer to a family of enzymes which are capable of hydrolyzing ester bonds in various substrates. Esterases are distinguished from lipases on the basis of the carbon chain length of the fatty acid moieties which are hydrolyzed. In general, lipases are effective to hydrolyze fatty acid esters of fatty acids having a carbon chain length of $C_{12}$ or higher. As used herein, the term esterase refers to those lipolytic enzymes having the ability to hydrolyze esters of shorter chain fatty acids having a chain length of $C_{10}$ or lower. The preferred source for the esterase of the present invention is an extract of the throat tissue of calves, lambs and kids, or mixtures thereof. Such esterases are available from the Dairyland Food Laboratory under the trade name Lipase C, K or KL. The esterase, as obtained from the supplier, is added to the substrate at a level of from about 0.5 gram to about 3.0 grams of esterase (dry basis) per pound of the fat source in the substrate.

After the addition of the esterase to the substrate, the mix is homogenized at a pressure of from about 500 p.s.i. to about 3,000 p.s.i., single stage, so as to homogenize the substrate. The homogenization suspends the fat particles in colloidal form throughout the product and provides the fat in more suitable dispersed form which is more readily acted upon by the esterase.

After homogenization, various other flavoring cultures and enzymes may be added to the substrate if desired. In this connection, proteolytic and lactic acid producing cultures and proteolytic enzymes may be added. The flavor producing microorganisms may be selected from *S. lactis, S. diacetylactis, L. citrovorum, L. bulgaricus, L. lactis, L. casei* and proteolytic micrococci, or mixtures thereof. The flavor organism is generally added at a level of from about 0.1 percent to about 2.0 percent of a viable culture of the organism, based on the total weight of the substrate. It is understood, however, that the use of a flavor organism is an optional step and is not essential in the process of the invention.

Thereafter, the substrate is incubated and fermented for a period of time sufficient to develop the desired flavor. In general, the fermentation is allowed to proceed for a period of time of from about 10 hours to about 50 hours at a temperature of from about 80° F. to about 110° F. During the fermentation process, a substantial level of the $C_{10}$ and lower fatty acid moieties are split off and are freed from the triglyceride fat source present in the substrate, while the $C_{12}$ and higher fatty acid moieties are substantially undisturbed. At the end of the fermentation period, a strongly flavored fermentation product is provided which is suitable for flavoring proteinaceous material as described hereinbelow. The level of fat splitting is controlled by the time that the fermentation process is allowed to proceed. The strongly flavored product obtained after the fermentation period may be immediately and subsequently combined with a proteinaceous material. Preferably, the proteinaceous material is blended with the fluid fermentation product, and drying of the mixture is then effected.

The proteinaceous material of the present invention is animal or vegetable protein sources. Preferred proteinaceous materials are selected from whey solids, buttermilk solids, skim milk solids, delactosed whey solids, whey treated by various processes to increase the protein level thereof, such as ultrafiltration, reverse osmosis, electrodialysis and gel filtration processes, casein and caseinates, wheat protein (gluten), soy protein, cottonseed protein and mixtures thereof. The method of the present invention is particularly suitable for imparting an improved cheese-like flavor to milk byproducts such as buttermilk, whey, delactosed whey, ultra-filtered whey and mixtures thereof. In general, the product resulting from the fermentation step as described above is combined with the proteinaceous material at a level of from about 3 parts to about 0.3 part of the fermentation product per part of the proteinaceous material by weight, dry basis.

As indicated, it is preferred to combine the fermentation product with the proteinaceous material prior to effecting drying by suitable means. In this connection, the fermentation product is mixed with the desired proteinaceous material in a blender provided with heating means. The mixture is then heated to a suitable temperature to aid in blending the proteinaceous material with the fermentation product and to inactivate the esterase and prevent further fat splitting activity. In this connection, a temperature of from about 140° F. to about 235° F. for a hold time of from about one hour to substantially instantaneous is suitable.

Emulsifying salts may be added to the mixture at levels of up to about three percent by weight to aid in providing a homogeneous blend in the mixture. Suitable emulsifying salts are those commonly used in the preparation of process cheese and include monosodium phosphate, disodium phosphate, dipotassium phosphate, trisodium phosphate, sodium metaphosphate (sodium hexametaphosphate), sodium acid phosphate, tetrasodium pyrophosphate, sodium aluminum phosphate, sodium citrate, potassium citrate, calcium citrate, sodium tartrate, sodium potassium tartrate and mixtures thereof. It is preferred that the solids content of the mixture prior to spray drying be in the range of from about 20 percent to about 60 percent solids by weight.

The mixture of the fermentation product and the proteinaceous material is then pumped to a dryer where it is dried to provide a flavoring material having a highly developed, cheese-like flavor. Any suitable drying apparatus may be used. It is preferred, however, to use a spray dryer so as to provide the dried product in powdered, free flowing form.

In an alternate method for imparting cheese-like flavor to proteinaceous materials, the proteinaceous material may be combined with the cheese protein source and fat source prior to effecting fermentation. In this embodiment some lactic acid will be produced if the proteinaceous material has any substantial level of lactose and if a lactic acid producing organism is included in the fermentation mixture. Such production of lactic acid is neither helpful nor harmful, but does influence the flavor of the finished product. It is preferred, however, that the fermented product have a pH in the range of from about 4.8 to about 7.0 at the time of effecting spray drying. Some adjustment of the pH may be required if any substantial level of lactic acid is produced during the fermentation.

The product of the present invention has a substantially stronger cheese-like flavor than cheese products prepared by simple mixing and drying of cheese materials. The flavor is considered particularly suitable for coating snack products and for inclusion in baked goods.

The following example illustrates various features of

EXAMPLE

Three hundred pounds of Cheddar cheese, which has been aged for a period of four months, is comminuted into pieces approximately ⅛ inch in size. The comminuted cheese is then mixed with butter which has been comminuted to provide particles of about ⅛ inch in size. The mixture of cheese and butter is then placed in a cooker provided with an agitating blade. The mixture is then heated to a temperature of 170° F. for a hold time of five minutes while being agitated. Thereafter, 45 gallons of water at a temperature of 45° F. is added to the mixture in the cooker so as to cool the mixture to a temperature of 100° F. A mixture of esterases obtained from the throat tissues of calves, lambs and kids is then added to the mixture at a level of 1.25 grams of the esterase per pound of butter in the mixture.

The mixture is thereafter homogenized at 1,000 p.s.i., single stage. The mixture is then pumped to a tank where fermentation is effected. A lactic starter culture is added to the mixture in the fermentation tank. Fermentation is allowed to proceed for a period of 24 hours at a temperature of 100° F.

The mixture is then pumped to a cooker provided with an agitating blade. 75 pounds of buttermilk having 30 percent solids, 134 pounds of acid whey obtained from a cottage cheese making operation and having 50 percent solids and 134 pounds of sweet whey obtained from a Cheddar cheese making operation and having 50 percent solids are then added to the fermented product in the cooker. Twelve pounds of sodium chloride, 7 pounds of sodium disodium phosphate are then added to the mixture in the cooker. The mixture is then heated with agitation to a temperature of 160° F. for a hold time of three minutes. The mixture is then pumped to a spray dryer and is dried to provide a dry, highly flavored powder with a strong cheese-like flavor.

The flavored powder obtained is used to coat corn collets. The collets are judged to have a superior cheese-like flavor when compared to collets coated with a spray dried powdered Cheddar cheese material.

The method of the present invention for providing a highly flavored powdered material with an improved cheese-like flavor is subject to numerous variations and modifications. Such modifications to the process of the present invention are considered to be within the scope of the invention which is defined by the following claims.

What is claimed is:

1. A process for producing a proteinaceous powdered flavoring material with an enhanced cheese-like flavor, comprising the steps of
providing a cheese protein-fat substrate by mixing together from about 40 to about 80 percent by weight of a cheese protein source selected from natural ripened or unripened cheese, process cheese and mixtures thereof, and from about 60 to about 20 percent by weight of a triglyceride fat source, based on the combined weight of the mixture of the cheese protein source and the fat source, said fat source having at least about 3 percent by weight of said fat source of $C_{10}$ or lower saturated fatty acid moieties,
subjecting said substrate to elevated temperature conditions sufficient to substantially inactivate lipolytic enzymes present in said substrate,
adding to said substrate from about 20 to about 80 percent by weight of water, based on the weight of the substrate, and cooking the substrate to between about 90° F. and about 120° F. to provide a liquid substrate,
inoculating said substrate by adding to said substrate an esterase obtained from the throat tissue of calves, lambs and kids and mixtures thereof suitable for the hydrolysis of $C_{10}$ or lower fatty acid esters,
incubating and fermenting said inoculated substrate at a temperature of from about 80° F. to about 110° F. for a period of time of from about 10 hours to about 50 hours to free at least a part of said $C_{10}$ or lower fatty acid moieties and to provide said substrate with a strong cheese-like flavor,
combining said substrate with a proteinaceous material selected from whey, treated whey, buttermilk, skim milk, casein, caseinate, soy protein, yeast protein and mixtures thereof in a ratio of from about 0.3 part to about 3 parts of said substrate to about 1 part of said proteinaceous material, said parts being on a dry weight basis,
said combining of said substrate with said proteinaceous material being done with said substrate in liquid form or in dry form, and when said combining is done with said substrate in liquid form, thereafter drying the combined materials to provide a powdered flavoring material with an enhanced cheese-like flavor.

2. A process in accordance with claim 1 wherein said proteinaceous material is combined with said substrate prior to effecting fermentation of said substrate.

3. A process in accordance with claim 1 wherein said cheese protein source is selected from American type cheese, Pasta Filata type cheese, Swiss cheese, brick cheese, Munster cheese, Gouda cheese, cream cheese, Neufchatel cheese, cottage cheese and mixtures thereof.

4. A process in accordance with claim 1 wherein said fat source is selected from butterfat, coconut oil, palm kernel oil, babassu oil and mixtures thereof.

5. A process in accordance with claim 1 wherein said elevated temperature conditions to which said substrate are subjected are from about 150° F. to about 235° F. for a hold time of from about one hour to substantially instantaneous.

6. The product of the process of claim 1.

7. A process in accordance with claim 1 wherein said fermentation occurs over a period of time of from about 10 hours to about 50 hours.

8. A process in accordance with claim 1 wherein said substrate is in a liquid form at the time of combining said substrate with said proteinaceous material.

9. A process in accordance with claim 1 wherein said substrate is in a dry form at the time of combining said substrate with said proteinaceous material.

10. A process in accordance with claim 1 wherein said substrate is homogenized prior to effecting fermentation thereof.

11. A process in accordance with claim 10 wherein said proteinaceous material is combined with said liquid substrate after fermentation of said substrate and prior to drying said substrate, wherein said liquid fermented substrate is heated to inactivate said esterase, and wherein said liquid combination of said substrate and said proteinaceous material has a solids content in the range of from about 20 percent to about 60 percent by weight prior to drying thereof.

References Cited
UNITED STATES PATENTS

| | | | |
|---|---|---|---|
| 3,072,488 | 1/1963 | Watts et al. | 99—115 |
| 3,100,153 | 8/1963 | Knight | 99—116 |
| 2,794,743 | 6/1957 | Farnham | 99—116 UX |

MORRIS O. WOLK, Primary Examiner

S. MARANTZ, Assistant Examiner

U.S. Cl. X.R.

426—38, 221